United States Patent
Marten et al.

[15] 3,693,422
[45] Sept. 26, 1972

[54] VEHICLE TESTING APPARATUS

[72] Inventors: John Anthony Marten; Bernard Arthur Gee, both of Norfolk, England

[73] Assignee: Suntester Limited, Kings Lynn, Norfolk, England

[22] Filed: March 15, 1971

[21] Appl. No.: 124,402

[52] U.S. Cl. ....................................73/117, 73/134
[51] Int. Cl. ..............................................G01l 5/13
[58] Field of Search................73/117, 134, 133, 138

[56] References Cited

UNITED STATES PATENTS

| | | | |
|---|---|---|---|
| 2,946,219 | 7/1960 | Kemper | 73/136 R |
| 3,554,022 | 1/1971 | Geul | 73/117 |
| 3,130,581 | 4/1964 | Schulman | 73/136 R |
| 466,214 | 12/1891 | Behr | 73/138 |

Primary Examiner—Jerry W. Myracle
Attorney—Molinare, Allegretti, Newitt & Witcoff

[57] ABSTRACT

The disclosure describes a chassis dynamometer having at least one pair of rollers for contact with at least one traction wheel of a motor vehicle, one of the rollers being braked by an eddy-current brake the stator of which is mounted for pivotal movement in accordance with the braking torque developed against a resilient bias. A perforated disc is mounted on and for movement with the stator of the eddy-current brake, the rim of the disc being in driving contact with the surface of the second disc driven to rotate by the other roller so that the speed of rotation of the first disc is substantially proportional to the traction power output of the motor vehicle.

11 Claims, 4 Drawing Figures

PATENTED SEP 26 1972  3,693,422
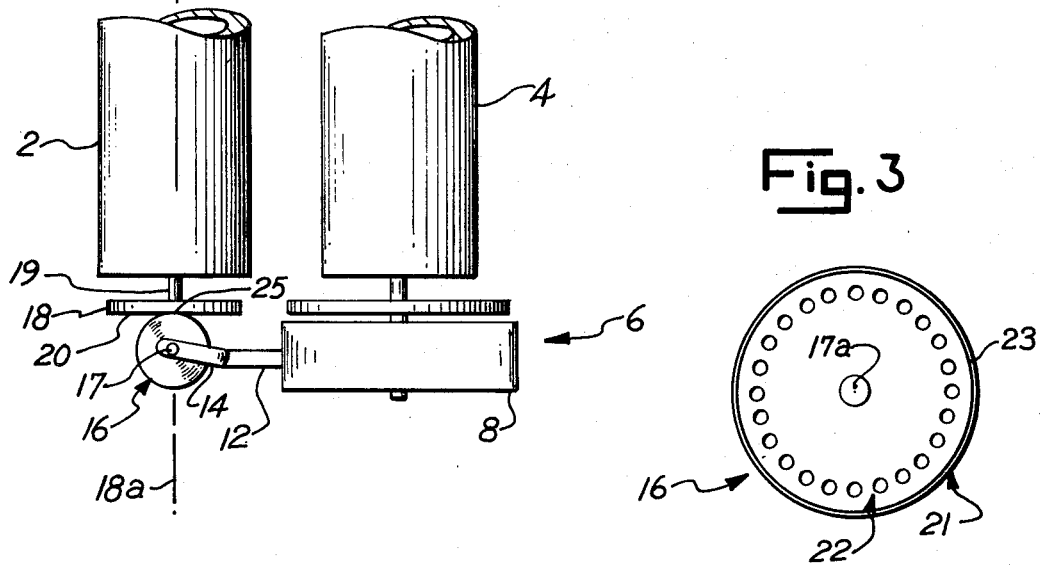
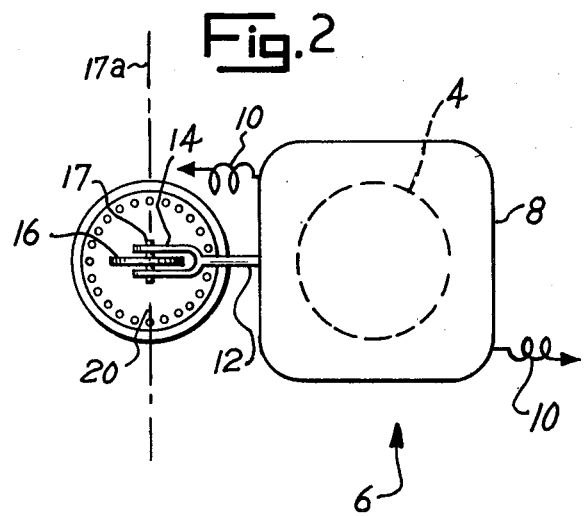
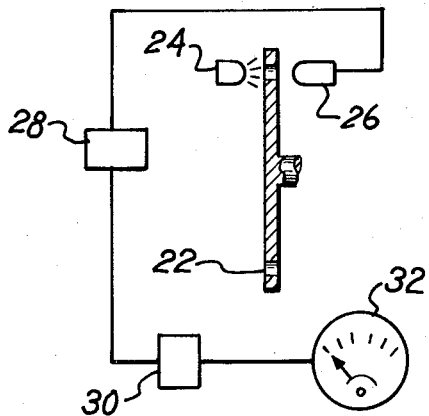
INVENTORS
JOHN ANTHONY MARTEN
BERNARD ARTHUR GEE
BY Molinare, Allegretti,
Newitt & Witcoff
ATTORNEYS

VEHICLE TESTING APPARATUS

RELATED APPLICATION

Applicants hereby claim priority under 35 U.S.C. 119 based on patent application No. 12868/70 filed Mar. 17, 1970 in Great Britain by applicants' legal assignee, Suntester Limited, a British Company of Old Meadow Road, Harwick Industrial Estate, King's Lynn, Norfolk England.

BACKGROUND OF THE INVENTION

This invention relates to chassis dynamometers, and more particularly relates to devices for measuring power in connection with dynamometers.

Chassis dynamometers are used to measure the tractive effort or power of motor driven road vehicles and have at least one pair of spaced parallel rollers for driving engagement with at least one traction wheel of a motor vehicle. Braking torque is applied to at least one of the or each pair of rollers, for example by means of an eddy-current brake. In order to measure the power absorbed by the dynamometer, which is substantially equal to the power output of the vehicle being tested, it is usual by some means or other to multiply a signal proportional to speed and a signal proportional to the braking torque of the brake.

In one previously proposed chassis dynamometer a voltage signal proportional to speed is generated by a tach-generator the resulting speed-voltage being applied across the track of a potentiometer, the position of the wiper of the potentiometer being determined by the braking torque generated by the dynamometer. Such an arrangement has disadvantages in that suitably accurate tach-generators are often expensive to buy or to manufacture. Also, if it is desired that the dynamometer should be capable of running in both a forward and a reverse direction then either the central position of the wiper on its track has to represent zero torque, which results in half of the accuracy for a given potentiometer, or else more complicated means have to be provided so as to insure that the direction of potentiometer wiper movement is independent of the sense of the braking torque, i.e., the direction of movement is independent of the forward or reversed direction of rotation of the dynamometer rollers.

SUMMARY OF THE INVENTION

In order to overcome the disadvantages of the prior art apparatus, applicants have invented improved apparatus for measuring the power produced by a source of energy that is used to drive the first and second rollers of a chassis dynamometer. According to a preferred feature of the invention, the apparatus comprises first and second rotatable members that comprise planar and circular surfaces and first and second axes of rotation, respectively. First means are utilized for holding the circular surface in contact with the planar surface, and second means are utilized for applying torque in a first direction to the second roller. Third means rotate one of the rotatable members at a velocity proportional to the velocity at which the first roller is rotated by the source. In addition, fourth means are used for moving the other rotatable member in relationship to the one rotatable member so that the circular surface moves with respect to the planar surface in one direction in proportion to the amount of torque applied to the second roller in the first direction. By employing this apparatus, the velocity of the other rotatable member is substantially proportional to the power absorbed by the dynamometer.

According to another feature of the invention, the apparatus comprises a pair of discs, the edge of one disc being in driving engagement with a face of the other disc, one of the discs being driven at a speed dependent on the speed of rotation of the dynamometer rollers, the other disc being arranged for transverse relative movement dependent on the braking torque of the dynamometer so that the speed of rotation of the other disc is substantially proportional to the power absorbed by the dynamometer.

For example, according to a preferred practice of the invention, a first disc of the pair may be driven to rotate by one of the said rollers, the other disc being rotatably mounted with its edge in driving engagement with the first disc and being arranged for movement over the surface of the first disc and in accordance with the braking torque of the dynamometer so that the speed of rotation of the said other disc is substantially proportional to the power absorbed by the dynamometer. It will be appreciated that the two discs and their respective mountings may be inexpensively manufactured, and that since the position of the said other disc which corresponds to zero torque is at the center of rotation of the first disc the said other disc may move in either of two opposed directions according to the sense of the torque, i.e., positive or negative torque.

The speed of rotation of the said other disc is easily measurable in many inexpensive ways. In the preferred form of the invention, the said other disc has a hole or slot, or a series of holes or slots equally spaced and arranged in a circle concentric with the axis of rotation of the disc, the speed of rotation of the disc being measured by means comprising a light source and a photosensitive device fixedly mounted on opposite sides of the disc so that it can rotate therebetween and so that whilst rotating, flashes of light from the light source are incident through the holes on the photo-sensitive device, means being provided to record and/or to give a visual indication of the frequency of a pulse output signal from the photo-sensitive device.

DESCRIPTION OF THE DRAWING

These and other advantages and features of the present invention are hereinafter described for purposes of illustration, but not of limitation, in connection with the accompanying drawing in which like numbers refer to like parts throughout, and in which:

FIG. 1 is a fragmentary, top plan view of a preferred form of apparatus made in accordance with the present invention, shown in connection with the rollers of an exemplary chassis dynamometer;

FIG. 2 is a partially schematic front elevational view of the apparatus shown in FIG. 1;

FIG. 3 is an enlarged, plan view in greater detail of one of the discs of the chassis dynamometer shown in FIGS. 1 and 2; and FIG. 4 is a cross-sectional view of the disc shown in FIG. 3, together with additional apparatus used to determine the velocity of the disc.

DESCRIPTION OF THE PREFERRED EMBODIMENT

As may be seen from the drawings, the chassis dynamometer comprises two parallel spaced and rotatably mounted rollers 2 and 4.

The rollers may either be long enough to support and be driven by a source of energy, such as two traction wheels of a motor vehicle, or else two linked pairs of rollers may be provided. The roller 4 is connected to the rotor of a brake, in this case an eddy-current brake 6, whose stator 8 is mounted for rotational movement about the axis of rotation of the roller 4 against a resilient bias provided by springs 10. The angular movement of the stator 8 of the eddy-current brake 6 is thus proportional to the braking torque it develops.

An arm 12 is fixedly mounted on stator 8 of eddy-current brake 6 and has at its outer end a fork 14 in which a disc 16 is mounted by a pin 17 to rotate about an axis 17a that passes through the center of pin 17.

A disc 18 is mounted for rotational movement with roller 2, and arm 12 is so biased by resilient means (not shown) as to bring disc 16 into driving engagement with a flat, planar face 20 of disc 18. Disc 16 is provided with a rubber or synthetic rubber tire 21 that defines its circular perimeter and a circular surface 23 (which may be for example a suitable O-ring) so as to reduce any slip between two discs 16 and 18. Further to reduce any slippage, face 20 of disc 18 has a slightly rough finish.

The arrangement is such that when the eddy-current brake is not generating torque, disc 16 contacts the disc 18 in a normal position substantially at its center of rotation, so that axis 18a passes through the point of contact 25. In addition, axes 17a and 18a are perpendicular to each other, and axis 17a is parallel to face 20. In the normal position, axis 18a lies in the plane of circular perimeter 23. Brake stator 8 is mounted for limited rotation against resilient bias springs 10 such that its angular rotation is proportional to the torque generated by brake 6. Disc 16 is rotatably mounted on arm 12 which is fixedly mounted on stator 8 of brake 6 so that, in fact, the movement of disc 16 is arcuate over the surface of a face 20 of a disc 18. A small amount of slippage is experienced with this arrangement, but this is found to be substantially linear with torque, and hence is taken care of by calibration.

As disc 16 is moved over the surface of disc 18, the speed of rotation of disc 16 depends on the product of the speed of rotation of disc 18 and the distance from the center of disc 18. It will be appreciated that in the arrangement shown, the distance of disc 16 from the center of disc 18 is substantially proportional to the angular deflection of stator 8 of eddy-current brake 6. The deflection is dependent on the torque generated by the eddy-current brake. The speed of rotation of disc 16 is dependent on the product of the speed of rotation of disc 20 and the torque generated by the eddy-current brake. The speed of rotation of disc 20 is dependent on the speed of rotation of the driving wheels of the motor vehicle, and hence, the speed of rotation of disc 16 is dependent on the power generated by the motor vehicle.

As may be seen from FIG. 3, disc 16 has a series of orifices 22 arranged in a circle whose center is the center of rotation of the disc. A light source 24 and a photo-sensitive device 26 (in this case a photo-sensitive transistor) are fixedly mounted on opposite sides of disc 16 so that when the disc rotates between them, photo-sensitive device 26 receives a flash of light corresponding to each orifice 22. It will be appreciated that the frequency of the output pulses of photo-sensitive device 26 is dependent on the speed of rotation of disc 16 and hence on the power absorbed by the dynamometer.

In order to provide a visual indication of the power absorbed by the dynamometer, the output signal from photo-sensitive device 26 is shaped by a pulse squarer 28, and the leading edge of each output pulse from the pulse squarer is arranged to trigger a monostable circuit 30 so as to provide an output pulse of fixed duration and magnitude corresponding to each output pulse from the photo-sensitive device 26. Pulse output from the monostable circuit is fed to a winding of a D.C. ammeter 32 whose deflection depends on the average value of the current passing trough it. Since the pulse is of predetermined duration and magnitude, the average value of the current passing through the meter depends on the frequency of the pulses, and hence, on the power absorbed by the dynamometer.

Those skilled in the art will appreciate that the preferred embodiments described herein may be altered and modified without departing from the true spirit and scope of the invention as defined in the appended claims.

What we claim is:

1. In a chassis dynamometer comprising a first roller and a second roller adapted to be rotatably driven by a source of energy, improved apparatus for measuring the power produced by the source comprising:

a first rotatable member comprising a planar surface and a first axis of rotation passing through the planar surface;

a second rotatable member comprising a circular surface adapted to rotate around a second axis of rotation;

first means for holding the circular surface in contact with the planar surface;

second means for applying torque in a first direction and a second direction to the second roller, said second means comprising a device that rotates through an arcuate path having a path length proportional to the amount of torque applied;

third means for rotating one of the rotatable members at a velocity proportional to the velocity at which the first roller is rotated by the source; and fourth means comprising a direct mechanical linkage between the other said rotatable member and said device for moving the other said rotatable member in relationship to the one said rotatable member in opposite directions so that the circular surface moves with respect to the planar surface along an arcuate path in proportion to the amount of torque applied to the second roller, whereby the velocity of the other said rotatable member is substantially proportional to the power absorbed by the dynamometer.

2. Apparatus, as claimed in claim 1, wherein the first means further comprises resilient means for holding the first and second rotatable members in a normal position in which one of the axes of rotation passes through the point of contact of the circular and planar surfaces, whereby movement of the one rotatable member results in no movement of the other rotatable member.

3. Apparatus, as claimed in claim 1, wherein:
the first rotatable member comprises a first disc;
the planar surface comprises a flat face of the first disc;
the first axis of rotation is perpendicular to the flat face;
the second rotatable member comprises a second disc having a circular perimeter;
the circular surface comprises the circular perimeter; and
the second axis of rotation is perpendicular to the plane of the circular perimeter.

4. Apparatus, as claimed in claim 3, wherein the second axis of rotation is parallel to the flat face of the first disc.

5. Apparatus, as claimed in claim 3, wherein the circular perimeter is formed by a resilient tire.

6. Apparatus, as claimed in claim 3, wherein:
the first means holds the circular perimeter of the second disc in contact with the flat face of the first disc;
the third means rotates the first disc; and
the fourth means moves the circular perimeter of the second disc over the flat face of the first disc.

7. Apparatus, as claimed in claim 6, wherein the second means comprises an eddy-current brake.

8. Apparatus, as claimed in claim 7, wherein the fourth means comprises:
a stator of the eddy-current brake;
resilient means for limiting the movement of the stator so that the angular position of the stator is proportional to the torque generated by the eddy-current brake; and
arm means for connecting the second disc to the stator for movement therewith.

9. Apparatus, as claimed in claim 1, and further comprising means for determining the angular velocity of the other rotatable member.

10. Apparatus, as claimed in claim 9, wherein the means for determining comprises:
means for defining orifices in the other rotatable member that lie along a common circle;
means for transmitting radiant energy through the orifices;
means for converting the radiant energy transmitted through the orifices into corresponding electrical pulses; and
means for displaying the frequency of the electrical pulses.

11. Apparatus, as claimed in claim 10, wherein the means for displaying comprises a D. C. ammeter.

* * * * *